US008639608B1

(12) United States Patent
Schmisseur

(10) Patent No.: US 8,639,608 B1
(45) Date of Patent: Jan. 28, 2014

(54) AUTOMATED STOCK TRANSACTIONS REGARDING ATHLETES TRANSITIONING BETWEEN COMPETITIVE LEVELS

(75) Inventor: Daniel R. Schmisseur, Brentwood, TN (US)

(73) Assignee: First Round Exchange LLC, Brentwood, TN (US)

(*) Notice: Subject to any disclaimer, the term of this patent is extended or adjusted under 35 U.S.C. 154(b) by 0 days.

(21) Appl. No.: 13/281,987

(22) Filed: Oct. 26, 2011

Related U.S. Application Data

(60) Provisional application No. 61/406,686, filed on Oct. 26, 2010, provisional application No. 61/447,677, filed on Feb. 28, 2011.

(51) Int. Cl.
*G06Q 40/00* (2012.01)
*A63F 9/24* (2006.01)

(52) U.S. Cl.
USPC .............................................. 705/37; 463/42

(58) Field of Classification Search
USPC ...................... 705/35–45; 463/462
See application file for complete search history.

(56) References Cited

U.S. PATENT DOCUMENTS

| 5,950,176 | A | 9/1999 | Keiser et al. | |
|---|---|---|---|---|
| 5,971,854 | A | 10/1999 | Pearson et al. | |
| 6,371,855 | B1* | 4/2002 | Gavriloff | 463/42 |
| 6,910,965 | B2 | 6/2005 | Downes | |
| 7,233,922 | B2 | 6/2007 | Asher | |
| 7,302,412 | B1 | 11/2007 | Speck | |
| 8,113,958 | B2* | 2/2012 | Johnson, Jr. | 463/42 |
| 8,210,916 | B2* | 7/2012 | Ma et al. | 463/4 |
| 8,393,970 | B2* | 3/2013 | Johnson, Jr. | 463/42 |
| 2002/0069161 | A1* | 6/2002 | Eckert et al. | 705/38 |
| 2002/0077952 | A1* | 6/2002 | Eckert et al. | 705/36 |
| 2002/0077961 | A1* | 6/2002 | Eckert et al. | 705/37 |
| 2003/0009415 | A1* | 1/2003 | Lutnick et al. | 705/37 |
| 2003/0018571 | A1* | 1/2003 | Eckert et al. | 705/37 |
| 2005/0171878 | A1 | 8/2005 | Pennock | |
| 2006/0247056 | A1* | 11/2006 | Luckerson | 463/42 |
| 2006/0259389 | A1* | 11/2006 | Richter | 705/35 |
| 2007/0005331 | A1* | 1/2007 | Han | 703/22 |
| 2007/0021165 | A1* | 1/2007 | Ma et al. | 463/1 |
| 2007/0021167 | A1* | 1/2007 | Ma et al. | 463/4 |
| 2007/0021214 | A1* | 1/2007 | Ma et al. | 463/42 |
| 2007/0021853 | A1* | 1/2007 | Ma et al. | 700/91 |
| 2007/0022029 | A1* | 1/2007 | Ma et al. | 705/35 |
| 2007/0233585 | A1* | 10/2007 | Ben Simon et al. | 705/35 |

(Continued)

OTHER PUBLICATIONS

Smith, Jimmy, "Millions on pass line as team roll dice: First-rounder's hefty worth based solely on their potential", Times-Picayune Picayune [New Orleans, LA], Apr. 26, 2008, pp. 1-4.*

(Continued)

*Primary Examiner* — Mohammad Z Shaikh
(74) *Attorney, Agent, or Firm* — Jackson Walker, LLP

(57) ABSTRACT

Performing automated stock transactions regarding athletes transitioning between completive levels may be accomplished by a variety of systems, processes, and computer program products. In particular implementations, prices for stock associated with athletes may be determined based on the athletes' projected salaries at the next competitive level. These prices may be used to sell the stocks to contestants. Additionally, revised stock prices may be determined based on the sale of stocks to contestants, and an auction function may allow contestants to exchange stocks. A final stock price for each stock may be determined based on the athletes' salaries at the next competitive level.

20 Claims, 8 Drawing Sheets

(56) References Cited

U.S. PATENT DOCUMENTS

| | | | |
|---|---|---|---|
| 2010/0161386 A1* | 6/2010 | Rabalais et al. | 705/10 |
| 2011/0034225 A1* | 2/2011 | Butz et al. | 463/4 |
| 2011/0237320 A1 | 9/2011 | Chim et al. | |
| 2012/0238352 A1 | 9/2012 | Wallens | |

OTHER PUBLICATIONS

Friedman, Josh, Football Gets Arbitraged; ProTrade.com takes fantasy leagues to another level by introducing Wall Street-like trading and adding nuance with esoteric statistics.: [Home Edition], Los Angeles Times [Los Angeles, Calif], Jan. 1, 2006, pp. 1-4.*

Massey, Dan, "Investing in minor leaguers is unlikely to pay dividends", Sunday News [Lancaster, Pa], Feb. 3, 2008, pp. 1-2.*

Anonymous, "Sports fans buy share of the action online; Oneseason.com users can create 'sportfolios'", Calgary Herald [Calgary, Alta], Oct. 2, 2008, pp. 1-3.*

Friedman, Josh, "Players Are Bought and Sold in Realistic Fantasy Game": [Final Edition], Los Angeles Times. Daily Press [Newport, News, Va], Jan. 15, 2006, pp. 1-3.*

"Protrade Unveils Innovative Stock Market Where Sports Fan Competes for Cash and Prizes", San Mateo, Calif, Busines Wire, Sep. 10, 2005, pp. 1-3.*

Siegler, MG, "Investors Put Their Money on StarStreet As They Open Two New Sports Stock Markets", techcrunch.com, Mar. 14, 2011, pp. 1-2.*

Smith, Jimmy, "Millions on pass line as teams roll dice: First-rounders' hefty worth based solely on their potential", Times-Picayune Picayune [New Orleans, La], Apr. 6, 2008, pp. 1-4.*

Hollywood Stock Exchange, Wikipedia, pp. 1-3, at least before Feb. 28, 2011 Apr. 14, 2011.

RotoHog, Wikipedia, pp. 1-6, at least before Feb. 28, 2011.

AthleteXchange, The Fantasy Sports Stock market, p. 1 of 1, at least before Feb. 28, 2011 Apr. 14, 2011.

Investors Put Their Money on StarStreet As They Open Two New Sports Stock Markets, MG Siegler, www.techcrunch.com, pp. 1-2, at least before Feb. 28, 2011.

Trade your favorite sports figure and make money, Brian Osborne, www.geek.com, pp. 1-3 Oct. 2, 2008.

SBR Review: AllSportsMarket, www.sportsbookreview.com, pp. 1-2 Jun. 9, 2007.

Wall Street Sports Partners with SportsLine USA, ClickZ, www.clickz.com, p. 1 of 1 May 22, 1998.

Fantasy sports stock simulation, Wikipedia, p. 1 of 1, at least before Feb. 28, 2011.

An Online Stock Market for Sports Fans, Bits, www.bits.blogs.nytimes.com, pp. 1-6 Oct. 1, 2008.

Protrade Unveils Innovative Athlete Stock Market Where Sports Fans Compete for Cash and Prizes, Business Wire, www.businesswire.com, pp. 1-3 Sep. 19, 2005.

Non-Final Office Action, U.S. Appl. No. 13/447,673, 10 pages, Nov. 27, 2012.

Non-Final Office Action, U.S. Appl. No. 13/493,905, 11 pages Mar. 28, 2013.

* cited by examiner

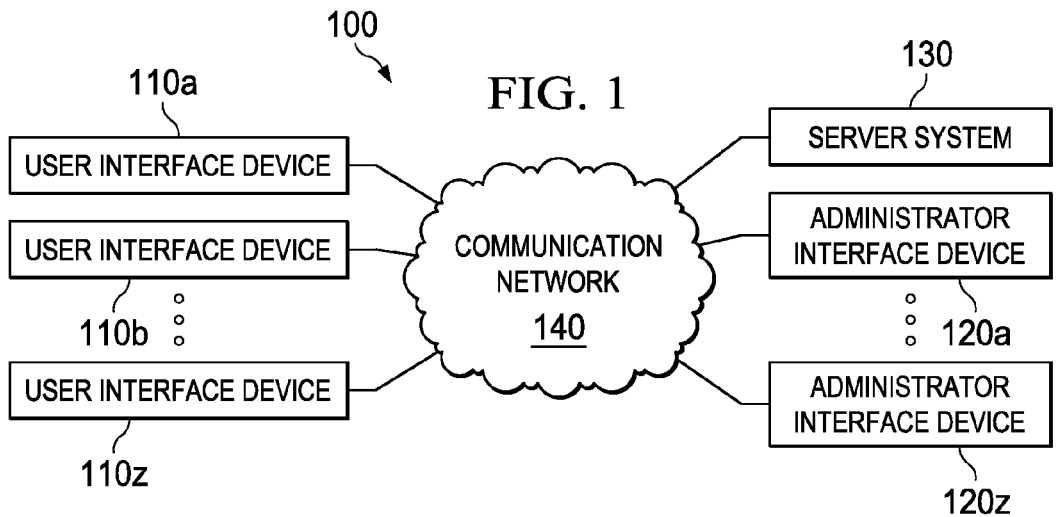

| PLAYER | POSITION | SCHOOL | GRADE |
|---|---|---|---|
| 1. Jack Lacker | DE | Florida State | 95 |
| 2. Bob Penn | QB | Washington | 95 |
| 3. Prince Amal* | WR | North Carolina | 95 |
| 4. A. G. White | CB | Nebraska | 94 |
| 5. Marcell Dares | OL | Georgia | 94 |
| 6. Andy Kruk | DT | Alabama | 94 |
| 7. Rasam Drowl* | QB | Stanford | 93 |
| 8. Nathaniel Soldier | OLB | Virginia | 93 |
| 9. Allan Bails | WLB | Colorado | 93 |
| 10. Jasoris Jenks* | RB | Miami (Florida) | 92 |
| 11. Mark Herlick | WR | Florida | 92 |
| 12. Ryan Mallard | OLB | Boston College | 90 |
| 13. Marcus West* | CB | Arkansas | 89 |
| 14. Carl Hayward | C | North Carolina | 88 |
| 15. Rodney Harrison | DT | Ohio State | 87 |

* Denotes draft-eligible underclassman

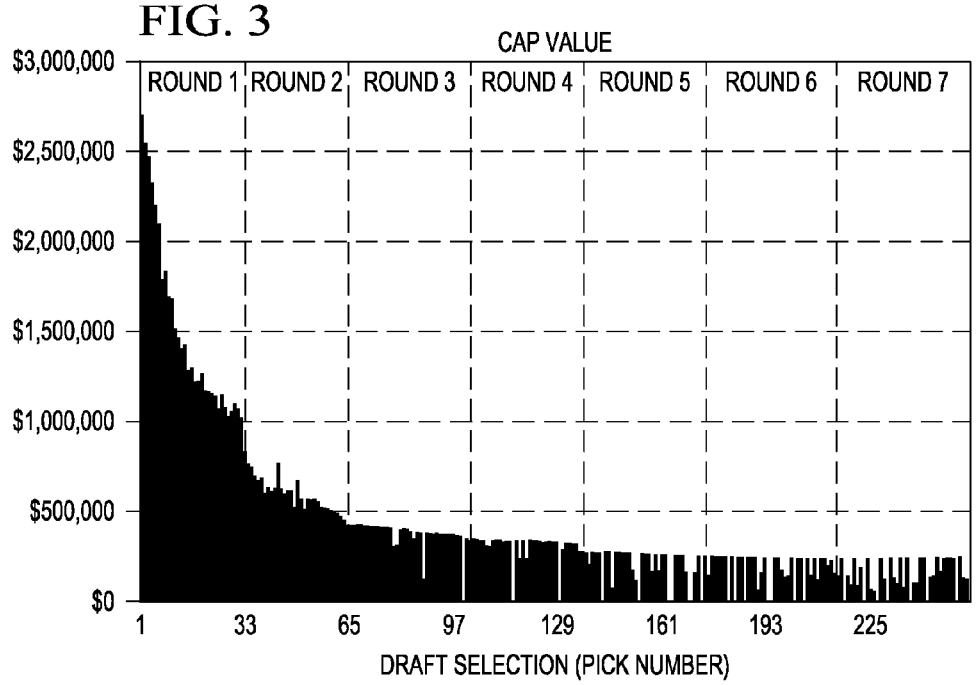
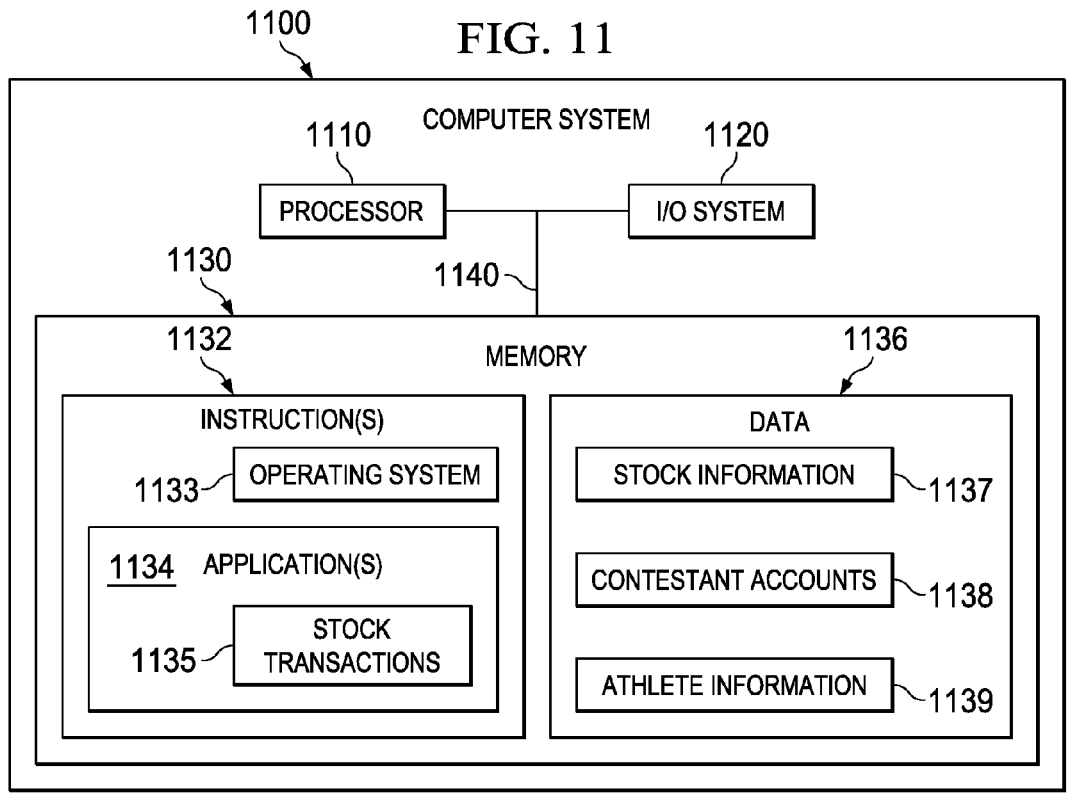

| Athlete | A S ID | Last | First | Feb. 24 Value | Feb. 24 Price | Feb. 23 Price | $ Change | % Change | IPO Price | $ Change | % Change |
|---|---|---|---|---|---|---|---|---|---|---|---|
| 1 | 297 | Acho | Sam | 677,375 | 677 | 680 | (3) | -0.4% | 665 | 12 | 1.8% |
| 2 | 177 | Adams | Darvin | 400,000 | 400 | 400 | - | -0.0% | 400 | - | 0.0% |
| 3 | 175 | Aiken | Danny | 400,000 | 400 | 400 | - | -0.0% | 400 | - | 0.0% |
| 4 | 144 | Ajiboye | Ladi | 400,000 | 400 | 400 | - | -0.0% | 400 | - | 0.0% |
| 5 | 120 | Allen | Anthony | 400,000 | 400 | 400 | - | -0.0% | 400 | - | 0.0% |
| 6 | 131 | Allen Jr. | Armando | 400,000 | 400 | 400 | - | -0.0% | 400 | - | 0.0% |
| 7 |  | Allen | Cortez | 400,000 | 400 | 400 | - | -0.0% | 400 | - | 0.0% |
| 10 |  | Arkin | David | 400,000 | 400 | 400 | - | -0.0% | 400 | - | 0.0% |
| 11 | 323 | Asiata | Matt | 815,375 | 815 | 902 | (86) | -9.6% | 925 | (110) | -11.9% |
| 12 | 310 | Austin | Marvin | 1,214,875 | 1,215 | 1,406 | (191) | -13.6% | 1,247 | (32) | -2.6% |
| 13 | 134 | Ayers | Akeem | 972,125 | 972 | 997 | (25) | -2.5% | 1,039 | (66) | -6.4% |
| 14 | 257 | Bailey | Allen | ... | ... | ... | ... | ... | ... | ... | ... |
| ... | ... | ... | ... |  |  |  |  |  |  |  |  |

FIG. 4

| 505 | 510 | 515 | 520 | 525 | 530 | 535 | 540 | 545 | 550 | 555 | 560 |
|---|---|---|---|---|---|---|---|---|---|---|---|
| Portfolio Stocks | Cost | Price | Unrealized G/(L) | Bid | Ask | Volume | High | Low | Draft Number | Kiper | Berman |
| A. Williams, Texas | 16.9 | 20.4 | 3.5 | 20.2 | 20.6 | 253 | 21.6 | 15.8 | 1/15 | 1/12 | 1/20 |
| K. Hunter, Oklahoma State | 8.5 | 12.2 | 3.7 | 12.1 | 12.4 | 648 | 12.6 | 4.3 | 2/8 | 3/13 | 4/31 |
| M. Ingram, Alabama | 14.5 | 9.3 | (5.2) | 9.0 | 9.4 | 1243 | 24.5 | 9.1 | 2/30 | 1/24 | 1/14 |
| Masoli, Ole Miss | 2.4 | 6.3 | 3.9 | 6.2 | 6.5 | 1039 | 6.5 | 1.8 | 3/20 | Undrafted | 6/19 |
| Unallocated Cap Value | 7.7 | 4.3 | (3.4) | | | | | | | | |
| Totals | 50.0 | 52.5 | 2.5 | | | | | | | | |

| Previous Stock Holdings | Acquire Date | Cost | Sell Date | Proceeds | Realized G/(L) |
|---|---|---|---|---|---|
| J. Locker, Washington | 10/2/10 | 27.5 | 11/16/10 | 24.1 | (3.4) |

565 ↗ (pointing to Unallocated Cap Value row)
570 ↗ (pointing to Totals row)

| Jevan Snead (RS Jr) | | |
|---|---|---|
| Event | Projection | Price |
| 2009 Pre-season | Performed very well in 2008 season, and many experts think will be high first round pick | IPO Value = $2.0M |
| 2009 Season | Performance did not meet expectations and is expected to return for final season | Stock declines to $400K |
| 2010 Combine | Performed well, but projections vary widely from second round pick to late round selection | Stock rises to $600K |
| 2010 Draft | Undrafted | Final Stock Value = $0 |

FIG. 6B

| Earl Thomas (RS So) | | |
|---|---|---|
| Event | Projection | Price |
| 2009 Pre-season | Performed well in 2008, but few project that will enter 2010 draft | IPO Value = $100K |
| 2009 Season | All-American for BCS Bowl team and speculation begins that he will enter draft | Stock rises to $600K |
| 2010 Combine | Exceeds expectations and is projected as a late first round pick | Stock rises to $1.6M |
| 2010 Draft | Selected 14th overall | Final Stock Value = $2.2M |

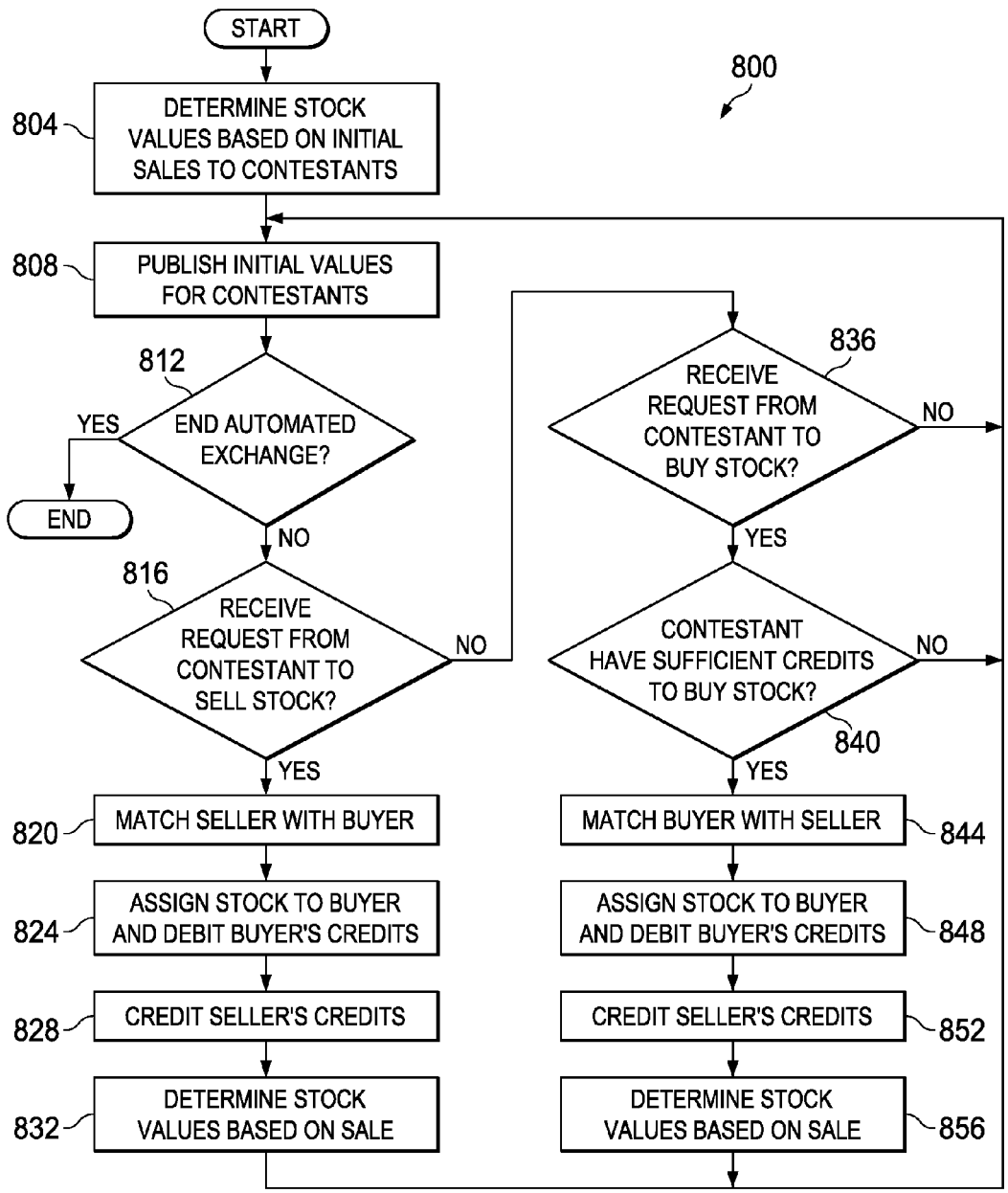

AUTOMATED STOCK TRANSACTIONS REGARDING ATHLETES TRANSITIONING BETWEEN COMPETITIVE LEVELS

BACKGROUND

The present invention relates to automated stock transactions, and more specifically to automated transactions for stock associated with athletes.

There are a large number of contests where contestants manage their own fictional sports teams and compete with other contestants. In these contests, contestants typically assemble their teams by competing in a draft or auction for the right to fictionally manage actual athletes, and the metrics used to measure performance of each team are usually based on the statistics accumulated by the individual athletes on each fictional team. In a football scenario, for example, the statistics could include yards gained, points scored, fumbles, interceptions thrown, completion percentage, yards allowed, takeaways, and points allowed. As another example, in a baseball scenario, the statistics could include hits, homeruns, batting average, stolen bases, earned run average, strikeouts, and saves. These contests typically begin at the beginning of a season and conclude at the end of the season.

BRIEF SUMMARY

Performing automated stock transactions regarding athletes transitioning between completive levels may be accomplished by a variety of systems, processes, and computer program products. In particular implementations, prices for stocks associated with athletes may be determined based on the athletes' projected salaries at the next level of competition. These prices may be used as a basis to sell stocks to contestants. Additionally, revised stock prices may be determined based on the sale of stock to contestants, and an auction function may allow contestants to exchange stocks for a period of time. A final stock price for each stock may be determined based on the athletes' salaries—projected or actual—at the next level of competition. In certain implementations, the athletes' projected salaries at the next level of competition may also be used to establish the prices at which contestants may buy and/or sell stocks. Projected salaries may, for example, be based on the athletes' placement in a professional league's entry draft.

BRIEF DESCRIPTION OF THE SEVERAL VIEWS OF THE DRAWINGS

FIG. 1 is a block diagram of an example system for implementing automated stock transactions regarding athletes transitioning between competitive levels.

FIG. 2 is a chart illustrating an example athlete rating system.

FIG. 3 is a graph illustrating an example valuation system for athletes.

FIG. 4 is a drawing illustrating an example user interface for presenting stock values associated with athletes.

FIG. 5 is a drawing illustrating another example user interface for presenting stock values associated with athletes.

FIGS. 6A-B are tables illustrating example factors affecting valuations for stocks associated with athletes.

FIG. 8 is a flowchart illustrating an example process for implementing an automated stock exchange regarding athletes transitioning between competitive levels.

FIG. 11 is a block diagram illustrating an example computer system for implementing automated stock transactions regarding athletes transitioning between competitive levels.

DETAILED DESCRIPTION

Figure 7:
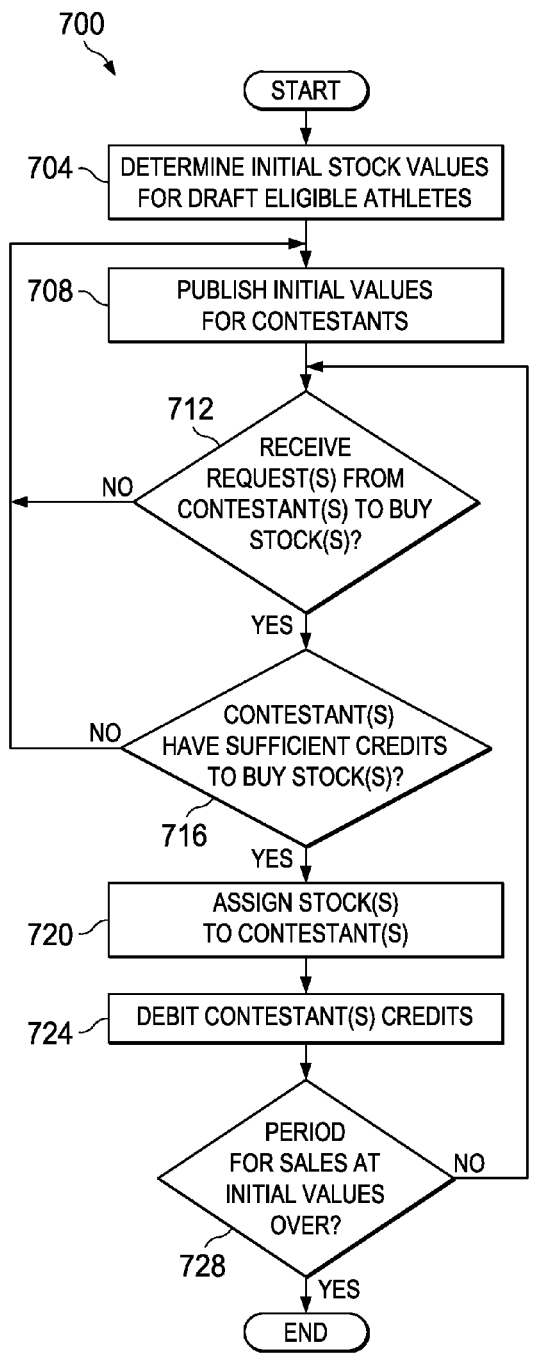
FIG. 7 is a flowchart illustrating an example process for implementing automated stock transactions regarding athletes transitioning between competitive levels.

Systems, processes, and computer program products for implementing automated stock transactions regarding athletes that are transitioning between competitive levels may have a variety of implementations. In certain implementations, for example, stocks associated with athletes may be offered to contestants at prices based on the associated athletes' projected salary at the next level of competition. The stocks may then fluctuate in value as they are traded between contestants based on each contestant's perception of the value of the stocks. Moreover, a final determination of the value of the stocks may be made at one or more terminal points (e.g., after an entry-level draft or when a new season starts), and the performance of various contestants compared. In certain implementations, the athletes' projected salaries at the next level of competition may also be used to establish the prices at which contestants may buy and/or sell stocks.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for implementing automated stock transactions regarding athletes that are transitioning between completive levels. For example, an athlete may be transitioning from an amateur level (e.g., college) to a professional level through a league's entry draft. In the discussion that follows, system 100 will mainly be described as implementing an automated stock exchange. However, system 100 may be used to implement other automated stock transactions in some embodiments.

System 100 includes user interface devices 110 for the contestants using the automated stock exchange, administrator interface devices 120 for the administrators of the automated stock exchange, and a server system 130 that executes the stock transactions. User interface devices 110, administrator interface devices 120, and server system 130 communicate with each other through a communication network 140.

In general, user interface devices 110 may be any type of logic devices that can receive information and present it to a user and receive information from a user and send it. User interface devices 110 may, for example, be personal computers, laptop computers, workstations, personal digital assistants, and/or cellular telephones. Through user interface devices 110, contestants may review the stocks that are available, buy and sell stock, and track their portfolios, all of which will be discussed in more detail below.

Administrator interface devices 120 may also generally be any type of logic devices that can receive information and present it to a user and receive information from a user and send it. Administrator interface devices 120 may, for example, be personal computers, laptop computers, workstations, personal digital assistants, and/or cellular telephones. Through administrator interface devices 120, an administrator of the automated stock exchange may monitor the buying and sell of stock to make sure the stock exchange is functioning properly and also make a market for stocks as required, all of which will be discussed in more detail below.

Server system 130 is responsible for, among other things, calculating stock values, executing stock transactions, and providing stock and athlete data to contestants. Server system 130 may be composed of one or more servers or clusters of servers (whether co-located or not). In particular implementations, server system 130 may enter into a client-server relationship with user interface devices 110 and administrator interface devices 120.

Communication network 140 may be any network or combination of networks for allowing user interface devices 110, administrator interface devices 120, and server system 130 to communicate with each other. For example, communication network 140 may include a local area network, a wide area network, and/or the Internet.

In certain modes operation, the automated stock transactions are begun by establishing initial values for stocks that are associated with athletes. In particular, the stocks represent the values of athletes that are transitioning between completive levels. Note that not all of the athletes that can transition between completive levels always do. In football, for instance, while an athlete typically must have completed at least three years of college to be drafted in the National Football League (NFL), he does not have to enter the draft if he does not want to (e.g., he can stay in college). As another example, in basketball, while an athlete typically must have completed at least one year of college to be drafted in the National Basketball Association (NBA), he does not have to enter the draft if he does not want to (e.g., he can stay in college or play for a professional team in an international league).

In determining the initial values of the stocks for many sports (e.g., football, basketball, and baseball), there are experts and/or services that make projections regarding the draft order of athletes, and the initial stock values may be based on the projected draft positions. Furthermore, the value of projected draft picks can be mapped to real dollars through the salaries that previous draft picks were paid (along with an adjustment for inflation, perhaps). Thus, athletes that may be transitioning to another level of competition may be mapped to a dollar value based on their projected draft position and the associated potential salary, and the stocks that are associated with them may be priced accordingly, perhaps with a small discount to the final projected value.

For example, in football there are experts (e.g., Todd McShay and Mel Kiper, Junior) that make projections regarding the draft order of college athletes. An example NFL draft projection is shown in FIG. 2. Moreover, the value of professional draft picks can be tied to real dollars through the NFL's salary cap rules, whether real or implied, and the fact that the salary cap distribution follows a fairly repeatable distribution, whether intentional or merely a result of market forces. In particular implementations, historical salary data for athletes in their first year of professional league participation could be used.

FIG. 3 shows the salary cap distribution for NFL rookies in 2005. As is typical, early draft choices usually receive larger salaries and, thus, count more against the salary cap, and later draft choices usually receive smaller salaries and, thus, count less against the salary cap. Of course, salaries typically are not the same every year (e.g., they usually go up), but, for example, while the salary cap value for the first draft choice in 2009 was $3.1 million, the distribution curve was similar. Thus, FIG. 3 illustrates an example valuation system for athletes based on historical actual first year salaries for drafted athletes.

The values of the stocks may be determined based on one or more experts' and/or rating services' projections. For instance, the projections of several experts and ratings services could be combined to determine a composite rating and that may be used and/or mapped to the salary value. These values may be discounted (e.g., 5-10%) to establish the initial values for these stocks. Multiple stocks associated with athletes may have exact or similar initial values, and there may be no stocks initially valued at amounts associated with specific draft picks. For example, in years where there is no consensus among the experts and/or the ratings services as to the athlete projected to be the first pick, the highest overall ranked athlete may be priced at a substantial discount to the value of the first overall pick in the professional draft. For instance, the highest overall ranked athlete may be ranked by five experts as the number 1st, 1st, 3rd, 4th, and 11th pick overall, which computes to an average ranking as the 4th pick. In such a case, the initial value of the highest ranked athlete may be valued in proximity to the salary projected for the 4th overall pick.

In certain implementations, more athletes may have associated values than there are draft positions. For instance, there are typically more draft-eligible athletes than there are draft positions. Values may also be assigned for athletes that have a draft projection outside of the available draft picks (e.g., maybe because they were projected as a late draft pick by only one expert and/or rating service) or do not have a projection at all. Values for stocks associated with these athletes may typically be assigned between zero and the value for the projected last draft pick, or lower.

The stock values do not have to be based on projected athlete salaries in all implementations. For example, in particular implementations, the stock values may be determined more directly from the associated athletes' projected draft positions. For instance, the stock values could be based on the athletes projected ordering for a draft (e.g., with the highest draft choice receiving the most points, and the lowest draft choice receiving the least points). The assigned values could be on a linear, quadratic, exponential, or other appropriate progression and be scaled as need to provide sufficient granularity.

For example, to establish stock values associated with prospective NFL athletes, the athlete rated as the first draft pick may be worth 255 credits and the athlete rated as the last draft pick may be worth 1 credit. In certain implementations, the stock values may need to be discounted to initial sales. The athletes could then be traded on the exchange based on the contestants' projections regarding the athletes' projected draft position, and the final values would be determined based on the actual draft positions.

To participate in the automated stock exchange, contestants may, for example, pay a fee (e.g., $10), receive an invitation to participate from an organizer (e.g., of a league, a party, a promotional event, or other appropriate group), or play for free under the specific terms of a sponsored league. The fee to join as an individual or to be a group organizer may, for example, be paid by credit card or PayPal. Each contestant is allotted a certain amount of credits (e.g., virtual salary cap dollars), which are an artificial currency internal to the exchange. In certain implementations, contestants may also be assigned or allowed to specify an identifier and a security code (e.g., a username and a password).

The credits are typically based on projected values (e.g., salaries) for the athletes. For example, based on the salaries shown in FIG. 2, a contestant may be allotted $10 million in credits, which would allow the contestant to buy the stock for several projected first round picks as well as several later round picks.

In particular implementations, not all contestants may be allotted the same amount of credits. For example, a contestant paying a smaller fee may be allotted a smaller amount of credits, and a contestant paying a larger fee may be allotted a larger amount of credits.

In certain implementations, a contestant may only be allowed to buy one share of stock associated with an athlete, which should encourage a contestant to develop a portfolio of investments. Moreover, a contestant's portfolio of stocks may be limited to a maximum number (e.g., 25). In other implementations, a contestant may be allowed to buy multiple shares of stock associated with an athlete and/or fractional shares of stock.

As with most stock transactions, the goal of the contestant is to maximize financial returns on a portfolio of stocks, which in this case represent pseudo-financial returns imputed from the estimated value of athletes as opposed to companies. As is typical, one way for a contestant to increase the value of a stock is to purchase one that is undervalued by the market at a point in time and sell the stock when it increases in value at a future time, which may be hours, days, weeks, or months later. A stock typically increases in value by the associated athlete performing well on the field or during public or private workouts, interviews, etc. and, hence, rising in draft expectation of other contestants or in the spot in which they are actually drafted. The stock, of course, can also fall by the athlete not performing well, as well as a host of other issues (e.g., injuries, legal problems, drug problems, better athletes at that position emerging, etc.). Moreover, there could be added volatility to the market due to the fact that some players eligible to be drafted may or may not elect to enter the draft, which could cause their stock to decrease in value.

Upon registering, contestants may be provided with biography information and/or projected value for available athletes so that they can make their initial selections. This information may be sortable based on various parameters (e.g., market price, volume, position, conference, team, and home state).

FIG. 4 illustrates an example user interface 400 that may be presented to a contestant on the contestant's user interface device in a football scenario. User interface 400 may, for example, be presented in a web browser.

As illustrated, user interface 400 presents an alphabetical listing of athletes 410 eligible for the 2011 NFL Draft. Each athlete 410 has an associated salary based on their projected draft position, which is presented in a salary value 420 section. Note that athletes 410*b-c* have projected salary values under $500,000, which is less than the expected value for the last draft choice. This is because athletes 410*b-c* are not currently projected to be drafted. However, there is a chance that they may be drafted, so they have been assigned a salary value. The projected salary value is then adjusted to the market price for the other stocks, which can be any derived price, whether real or artificial, and presented in a market price section 430.

User interface 400 also presents performance data regarding the market prices for the stocks associated with the athletes. For example, while market price 430 presents the price at a particular time (e.g., on a particular day), a market price section 440 presents the price at another time (e.g., on an earlier day), in this case the day before. Moreover, a price change section 450 and a percentage change section 460 show how the stocks' prices have changed between the two time periods. Additionally, an IPO price section 470 provides the stocks' market price at the initial public offering, and a price change section 480 and a percentage change section 490 show how the stocks' prices have changed since that time period.

The data in user interface 400 may be ordered in various ways by a user (e.g., a contestant). For example, in addition to ordering athletes alphabetically, the data could be ordered by projected value, current market price, price change, and percentage change. A contestant may thus use user interface 400 in various ways to evaluate potential stocks.

Although FIG. 4 illustrates one user interface 400 for a contestant, a variety of other user interfaces are possible. For example, a user interface may not present price history for a stock (e.g., IPO Price, $ change, % change, etc.). As another example, a user interface may present other stock transaction information. As a further example, a user interface may present draft projections (e.g., from experts or services) and/or athlete statistics.

As initial sales progress, the contestants begin to develop their portfolio of stocks. Moreover, these sales may be used to set the prices for the stocks (e.g., depending on the demand for the stock at the initial price). Later, users may buy/sell stocks according to current market values. Thus, secondary markets may develop, which are based on the contestants' perception of the value potential of a stock.

FIG. 5 illustrates an example user interface 500 that may be presented to a contestant on the contestant's user interface device in a football scenario. User interface 500 may, for example, be presented in a web browser.

As illustrated, user interface 500 lists the stocks that the contestant has in his portfolio in a section 505. The amount that the contestant paid for each stock is listed in a section 510, the current price of each stock is listed in a section 515, and the unrealized gain for each stock is listed in a section 520. Thus, the contestant can readily see which stocks have gained in value and which have lost in value.

User interface 500 also presents more detailed information regarding each stock in the portfolio. For example, the current bid price for the stock on the exchange is presented in a section 525, and the current ask price is presented in a section 530. Moreover, the volume of the stock traded over a time period (e.g., in a week) is presented in a section 535, and the historical high and low for the stock is presented in a section 540 and a section 545, respectively. Additionally, the draft position associated with the current price is presented in a section 550, and expert/service draft projections of interest are presented in a section 555 and a section 560. Thus, the contestant can readily see if the current price looks like a good value or not.

The unallocated value of the contestant's portfolio is presented in a section 565, where the price presented in section 515 represents the current value of contestant stocks based on the price of the last market trade, and the amount of salary cap value ("cash") available to purchase additional stocks.

Moreover, the total values for the contestant's portfolio are shown in a section 570. Thus, the contestant may readily observe the aggregate loss/gain for his portfolio.

Although FIG. 5 illustrates one user interface 500 for a contestant, a variety of other user interfaces are possible. For example, a user interface may not present the unrealized gain and/or the more detailed stock exchange data (e.g., Bid, Ask, Volume, etc.). Moreover, a user interface may present no draft projections, more experts'/services' draft projections, and/or an amalgamation of experts'/services' projections. As another example, a user interface may contain a number of stocks that the contestant is watching, along with any of their current stock exchange information. Furthermore, a user interface may present outstanding orders of the contestant.

In particular implementations, the user interface may be customizable by the user to present any type of information that the user desires. Moreover, information from the user interface may be extracted and customized into a stock ticker for the contestant (e.g., recent market trade for stocks owned or being watched). A ticker may also be added for breaking news about draft-eligible athletes.

In certain implementations, a contestant may be presented with a dashboard when the contestant logs in to server system 130. The dashboard may contain the contestant's personal information (e.g., account status, portfolio value, place in standings, news on athletes in portfolio, and news on athletes on a watch list). The dashboard may also contain information of the market (e.g., salary curve relative to market values of top 32 athletes, top 25 most active stocks, biggest gainers, unusual trading or bidding activities, etc.). Additionally, the dashboard may contain general athlete information (e.g., news ticker for information that impacts stock values, expert projections and mock drafts, status of draft eligible athletes, etc.).

Contestants may follow any strategy that they would like in developing their portfolios. For example, some contestants may use a large cap value strategy in which they focus on stocks of likely first round and second round picks. The stock values associated with these may fluctuate widely in the weeks before a draft. As another example, some contestants may be affinity contestants, in which they aggregate stocks associated with athletes of particular interest (e.g., from their favorite college teams and/or conferences). As a further example, some contestants may be micro cap contestants, in which they aggregate a portfolio of stocks associated with athletes not frequently included in draft projections. In the football scenario discussed above, for example, an athlete valued at $50,000 initially, which is below the value of for the projected last draft pick, could easily turn into a $300,000 value if he was drafted, which is a six-fold return on investment. Moreover, contestants could short the stock of one or more athletes, which means that they project the stock's value will decrease. It is possible for a contestant to lose all of his credits (e.g., if the value of all his stocks drops to zero or if he has all short picks, and they increase in value). In certain implementations, however, contestants may be allowed to purchase more credits.

In certain modes of operation, system 100 may operate as an automated stock exchange. In some of these modes, after the initial purchasing of the stocks, the value of the stock may be reassessed automatically (e.g., based one demand), and the contestants may then generally buy and/or sell stocks at any point in time while the automated stock exchange is active, although the execution of the orders may take a while depending on trading volume for a stock. Contestants may be allotted a number of transactions (e.g., 20) with their initial credit allotment and then be charged (e.g., $0.25/transaction) for larger numbers of transactions.

Contestants may be provided with biography information on available athletes so that they can make their selections. This information may be sortable based on various parameters (e.g., market price, volume, position, conference, team, and home state). Moreover, this information may be updated as new information becomes available (e.g., NFL combine data).

Contestants may be allowed to buy and sell stocks at the current market price established by the system, or in other implementations, by placing orders to buy the stock at a bid price or sell the stock at an ask price. In certain implementations, contestants may place market orders and limit orders to buy and sell stocks. An automated auction system may match buyers to sellers. In certain implementations, administrators may be given final approval of some or all of the exchanges. This may assist with investigating suspicious activities (e.g., large bid/ask spreads).

In some modes of operation, system 100 may determine stock values based on updates in projections by experts and/or rating services. The updated projections may, for example, be to draft positions and/or salaries, which may be based on updated draft position projections. The values of the stocks may be determined based on one or more experts' and/or rating services' projections. For instance, the projections of several experts and/or ratings services could be combined to determine a composite rating and that may be used and/or mapped to the stock value.

Multiple stocks may have exact or similar values, and there may be no stocks valued at amounts associated with specific draft picks. For example, if there is no consensus among the experts and/or the ratings services as to the athlete projected to be the first pick, the highest overall ranked athlete may be priced at a substantial discount to the value of the first overall pick in the professional draft. For instance, the highest overall ranked athlete may be ranked by five experts as the number 1st, 1st, 3rd, 4th, and 11th pick overall, which computes to an average ranking as the 4th pick. In such a case, the stock associated with the highest ranked athlete may be valued in proximity to the value projected for the 4th overall pick.

The updates may be performed on a time basis (e.g., daily, weekly, or monthly) and/or an event basis (e.g., after a season, after an evaluation event, etc.). Moreover, the contestants may not actually exchange stock with each other. For example, there may be shares available for each of the contestants.

Additional contestants can generally be allowed to participate in the automated stock exchange at any time. These contestants would also typically pay a fee for credits, and they would then be allowed to purchase stocks at current market prices.

The automated stock transactions can generally be started at any time and can last for almost any period of time (e.g., days, weeks, or months). For example, some draft projections become available soon after the last draft is completed. In the football scenario, for instance, draft projections may become available in May, and the automated stock transactions could be established during the summer and operated until the draft actually occurs, which is the next spring. As another example, the automated stock transactions could be started shortly before a draft (e.g., a few weeks) and continue until the draft actually occurs. Furthermore, the transactions could be continued until a later point (e.g., when all athletes are signed or until final rosters have been announced).

For example, in certain implementations, the automated stock transactions could continue until final rosters are announced before the season, which can provide a final value for the stock because the final value of the athlete's salary (e.g., actual contribution of the associated athlete against the salary cap) is known. The stock of athletes that are drafted and cut may be assigned a value of zero. Moreover, this provides a chance for the stock associated with athletes that have not been drafted but have been invited to a training camp to increase in value if they are signed.

FIGS. 6A-B show example value scenarios for two football athletes during the 2009 college football season. As can be seen, the values established at the beginning of the season fluctuated based on the athletes' performance during the season, the athletes' declaring for the draft, the athletes' performance at the NFL combine, and the actual draft choices.

As mentioned previously, the final stock values could be determined once the final rosters are announced or the next season actually starts. For example, the player represented in FIG. 6A was actually invited to an NFL training camp as an undrafted free agent, which may have caused the stock associated with him to have some value (e.g., $200K). And as he performed during camp, the stock value could have fluctuated (e.g., between $100K-$300K). However, he was eventually cut from the team before the season started, which would have probably resulted in the stock value returning to $0. If he had been signed, the stock value would have been at least $350K.

In some implementations, the stock values may actually be mapped to real money, although probably at a discount to the stock prices, to the contestants. For instance, a stock that is valued at $2M may actually be worth $2K in real dollars. Thus, the stocks may have actual cash values associated with them, and when a stock is sold, its gain or loss will have a direct financial effect, although actual gains and losses may not be determined until a particular time (e.g., after a draft or the start of a season). The users of the stock transaction system in these instances could be investors rather than contestants. The stock values may, for example, be determined according to an exchange scenario or a projection scenario. Moreover, in certain implementations, the stocks may actually be linked to certain athletes. For instance, an athlete may list himself on an exchange.

Server system 130 is responsible for operating the automated stock transactions. In particular, server system 130 can track the accounts for all the contestants and provide the account information to the contestants. Additionally, when contestants place buy and/or sell orders in exchange implementations, the server system can perform an auction function to exchange the stocks. For example, if a contestant places a buy order, the server system may rank the sell orders based on price and determine if there is an agreement between the price for the buy order and the price for the lowest sell order. Thus, the buyer should obtain the stock at the lowest available price.

Server system 130 may operate a stock exchange as a call market and/or a continuous market. If operated as a call market, the exchanges could, for example, be settled twice daily. If operated primarily as a continuous market, server system 130 may also operate a call market for determining opening prices if orders build up when trading is closed or suspended.

In particular implementations, server system 130 may also implement automatic market controls (e.g., to avoid bubbles). For example, in a football scenario, the server system may ensure that the cumulative market value does not exceed the projected market value, which in the football scenario may be the projected total rookie salary cap (e.g., $156 million in 2010). Server system 130 may also have financial barometers to adjust market prices to maintain approximate distribution relative to projected salaries.

Server system 130 may also provide information to contestants. For example, when the server system has information regarding an athlete, it may determine the contestants that own the stock associated with the athlete and/or that are watching the stock and send a message (e.g., e-mail, text, etc.) to the contestants. Moreover, the server system may publish the information (e.g., post it to a web-site). Additionally, the server system may publish a contestant leaderboard, which may be sortable by various parameters (e.g., portfolio size, region, state, city, IRR, capital gains, etc.).

Server system 130 may also determine the final values to be assigned to the stocks (e.g., when the draft is over) and determine the gains/losses for each of the contestants. Contestants that have managed their portfolio the best (i.e., biggest gains, biggest percentage gains, etc.) and worst (i.e., biggest losses) may be identified. These may also be broken out by class (e.g., $1 million credit class, $5 million credit class, and $10 million credit class). Server system 130 may also provide awards (e.g., free entry fee for next round) to those contestants that have performed the best.

Server system 130 may also operate a private league between certain contestants. In such leagues, groups of contestants typically compete among themselves for intra-league recognition. Private leagues may be set up based on a flat fee for the league and/or a cost for the number of contestants. Additionally, transaction costs may or may not be applied. The stock values for the league may be determined based on the values in the open league. Server system 130 may also provide an accounting system for the league, but would typically not be set up to handle cash exchanges, if any, between contestants. Server system 130 may also rank leagues against each other (e.g., for portfolio value creation) and provide awards to leagues that perform the best.

Server system 130 may provide league management tools for private leagues. For example, the league organizer (e.g., commissioner) may be provided with options to set up the league, invite contestants, and create a message board. Additionally, league standings may be published for league contestants and sorted by various metrics (e.g., capital gains).

As mentioned above, system 100 also includes administrator interface devices 130, which provide access to administrators of the automated stock exchange. The administrators may, for example, be responsible for addressing bubbles in the market and making a market for stocks that are not heavily traded. For example, an administrator may be provided with a certain number of shares of stock associated with each athlete. Thus, if there are no sellers when a buy order comes in, the administrator may sell its stock to the buyer. Additionally, if they are no buyers when a sell order comes in, the administrator may buy the stock. As more contestants are added to the automated stock exchange, more stock may be allotted to the administrators. Additionally, if a contestant desires to add a new stock to the market, which would be associated with a new athlete, the contestant may contact an administrator who will make a determination as to whether there is sufficient interest to add the stock.

System 100 provides a variety of features. For example, system 100 provides users a stock transaction contest in which the contestants buy, sell, trade, and own stock associated with athletes. Moreover, system 100 provides users an opportunity to continue competing in the contest during the offseason for their sport of interest (i.e., the time of year when their sport of interest is not playing). Additionally, it increases consumer interest in drafts of professional sports leagues.

FIG. 7 illustrates a process 700 for providing automated stock transactions regarding athletes that are transitioning between completive levels. Process 700 may, for example, be implemented by system 100.

Process 700 calls for determining an initial value for stocks associated with draft eligible athletes (operation 704). For example, the value of the stocks could be based on draft projections for the athletes (e.g., from one or more experts or ratings services) and a projected salary for the draft positions. Note that not all draft-eligible athletes may have an associated stock. Process 700 also calls for publishing the initial values for contestants (operation 708). The publication could be performed through direct communication (e.g., e-mail) or through centralized postings (e.g., on a web site).

Process 700 also calls for determining whether requests have been received from contestants to buy one or more stocks (operation 712). Once one or more requests from one or more contestants has been received, process 700 calls for determining whether the contestant(s) have sufficient credits to buy the stock(s) (operation 716). Each contestant may, for example, have been allotted credits when registering for the stock transactions. If the one or more contestants have sufficient credits, process 700 calls for assigning the requested stock(s) to the contestant(s) (operation 720) and debiting the credits of the contestant(s) (operation 724).

Process 700 also calls for determining whether the period for initial sales is over (operation 728). The period may, for example, be set for a specific time (e.g., one week) or until a number or percentage of stocks has been purchased. If the period for sales at the initial values is not over, process 700 calls for determining whether additional requests to buy stocks have been received (operation 712). If the period is over, process 700 is complete.

Although FIG. 7 illustrates one process for providing automated stock transactions regarding athletes that are transitioning between completive levels, other similar processes may contain fewer, additional, and/or a different arrangement of operations. For example, a process may include registering contestants and/or allotting credits. Additionally, a process may allow one or more contestants to form a league. As another example, a process may not determine if a period for initial sales is over.

FIG. 8 illustrates a process 800 for providing an automated stock exchange, a type of automated stock transaction, regarding athletes that are transitioning between completive levels. Process 800 may, for example, be implemented by system 100 and be executed after process 700.

Process 800 calls for determining stock values based on initial sales to contestants (operation 804). The initial sales may, for example, have occurred during an initial offering of the stocks to contestants. For instance, contestants could submit buy orders for a period of time, such as one week prior to the opening of the exchange, and a computer algorithm could be used to determine the actual prices at which the initial trades would be executed, based on demand and relative prices from the buy orders.

Process 800 also calls for publishing the values for contestants (operation 808) and determining whether the automated stock exchange should be terminated (operation 812). The automated stock exchange may, for example, terminate at a specific event (e.g., the beginning of the draft or the signing of the athletes to contracts) or at a specific time (e.g., the beginning of the season). If the automate stock exchange should terminate, process 800 is at an end.

If the automated stock exchange should not be terminated, process 800 continues with determining whether a request has been received from a contestant to sell a stock (operation 816). If a request to sell a stock has been received, process 800 calls for matching the buyer with a seller (operation 820). Process 800 may, for example, accomplish this by performing an auction function.

Once the buyer is matched to a seller, process 800 calls for assigning the stock to the buyer and debiting the buyer's credits (operation 824) and crediting the sellers credits (operation 828). Additionally, process 800 calls for determining new stock values based on the sale (operation 832), assuming it was the last executed transaction.

If there is no request to sell a stock, process 800 calls for determining whether a request has been received from a contestant to buy a stock (operation 836). If there is no request from a contestant to buy a stock, process 800 calls for continuing to publish the values (operation 808).

If a request to buy a stock has been received, process 800 calls for determining whether the contestant has sufficient credits to buy the stock (operation 840). If the contestant has sufficient credits, process 800 calls for matching the buyer with a seller (operation 844). Process 800 may, for example, accomplish this by performing an auction function.

Once the buyer is matched to a seller, process 800 calls for assigning the stock to the buyer and debiting the buyer's credits (operation 848) and crediting the seller's credits (operation 852). Additionally, process 800 calls for determining new stock values based on the sale (operation 856).

Other processes for implementing an automated stock exchange regarding athletes that are transitioning between completive levels may operate similarly to process 800. For example, some processes may include limit orders, in which a contestant specifies a price at which they are willing to do something (e.g., buy or sell). If there is no corresponding contestant order (e.g., buy or sell) that matches the limit order, the limit order may be held until a corresponding order occurs. Moreover, many of the operations in process 800 may be performed simultaneously and/or contemporaneously. For example, orders for buying and selling stocks may be received and executed at substantially the same time. Additionally, processes may be provided for selling stock short.

Figure 9:
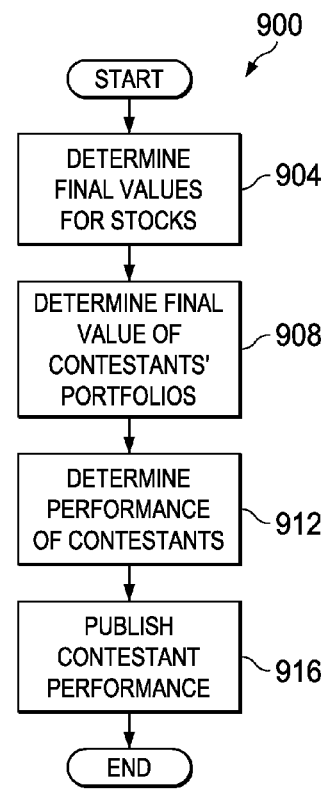
FIG. 9 is a flowchart illustrating another example process for implementing automated stock transactions regarding athletes transitioning between competitive levels.

FIG. 9 illustrates another example process 900 for providing automated stock transactions regarding athletes that are transitioning between completive levels. Process 900 may, for example, be implemented by system 100 and be executed after process 800.

Process 900 calls for determining a final value for stocks (operation 904). The final value for stocks may, for example, be based on the draft positions of the associated athletes and projected salaries for those positions. Using the final stock values, process 900 continues with determining the final value of the contestants' portfolios (operation 908).

Process 900 also calls for determining the performance of the contestants (operation 912). For example, the contestants can be evaluated based on largest gains and/or largest percentage gains. Moreover, these may be broken down by capitalization class. Process 900 additionally calls for publishing the contestant performance (operation 916). Thus, contestants can see how they fared relative to other contestants.

Figure 10:
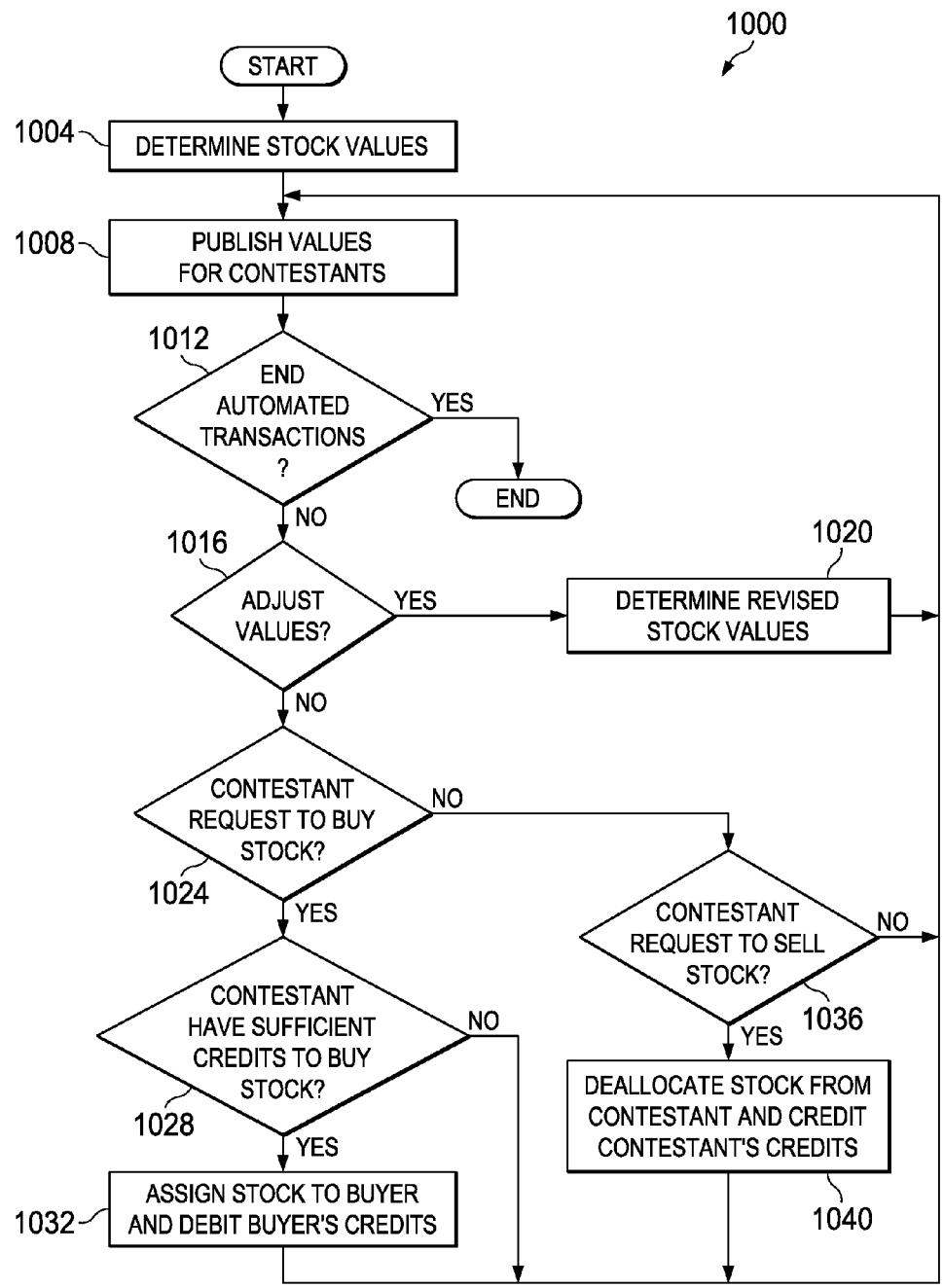
FIG. 10 is a flowchart illustrating an additional example process for implementing automated stock transactions regarding athletes transitioning between competitive levels.

FIG. 10 illustrates an additional example process for implementing automated stock transactions regarding athletes transitioning between completive levels. Process 900 may, for example, be implemented by system 100 and be executed after process 700 and before process 900.

Process 1000 calls for determining stock values. The stock values may, for example, be based on combining one or more rating service's draft projections with a projected salary for the associated athlete.

Process 1000 also calls for publishing the values for contestants (operation 1008) and determining whether to terminate the automated stock transactions (operation 1012). The automated transactions may, for example, terminate at a specific event (e.g., the beginning of the draft or the signing of the athletes to contracts) or at a specific time (e.g., the beginning of the season). If the automated stock transactions should be terminated, process 1000 is at an end.

If the automated transactions should not be terminated, process 1000 calls for determining whether to adjust stock values (operation 1016). Adjusting the stock values may, for example, occur on a periodic bases (e.g., daily) or an event basis (e.g., at the completion of an athlete evaluation event). If stock values should be adjusted, process 1000 calls for determining revised stock values (operation 1020) and publishing the stock values (operation 1008).

The revised stock values may, for example, be based on updates in projections by experts and/or rating services. The updated projections may, for instance, be to draft positions and/or salaries, which may be based on updated draft position projections. The values of the stocks may be determined based on one or more experts' and/or rating services' projections. For instance, the projections of several experts and/or ratings services could be combined to determine a composite rating and that may be used and/or mapped to the stock value. Multiple stocks may have exact or similar values, and there may be no stocks valued at amounts associated with specific draft picks.

If the stock values should not be adjusted, process 1000 calls for determining whether a request has been received from a contestant to buy a stock (operation 1024). If a request to buy a stock has been received, process 1000 calls for determining whether the contestant has sufficient credits to buy the stock (operation 1028). If the contestant has sufficient credits, process 1000 calls for assigning the stock to the buyer and debiting the buyer's credits (operation 1032). Process 1000 then calls for continuing to publish stock values for the contestants (operation 1008). If the contestant does not have sufficient credits, process 1000 again calls for continuing to publish stock values for the contestants (operation 1008).

If there is not a request to buy a stock, process 1000 calls for determining whether a request has been received from a contestant to sell a stock (operation 1036). If there is no request from a contestant to sell a stock, process 1000 calls for continuing to publish the stock values (operation 1008).

If, however, a request to sell a stock has been received, process 1000 calls for deallocating the stock from the seller and crediting the seller's credits (operation 1040). Process 1000 then calls for continuing to publish stock values for the contestants (operation 1008).

Other processes for operating automated stock transactions regarding athletes that are transitioning between completive levels may operate similarly to process 1000. For example, certain operations (e.g., the buying and selling of stock) may occur simultaneously and/or contemporaneously. Additionally, operations may be provided for selling stock short.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

FIG. 11 illustrates an example computer system 1100 that can implement automated stock transactions regarding athletes transitioning between completive levels. System 1100 may, for example, represent a server of server system 130. System 1100 includes a processor 1110, an input/output system 1120, and memory 1130, which are coupled together by a network system 1140.

Processor 1110 may, for example, be a microprocessor, which could, for instance, operate according to reduced instruction set computer (RISC) or complex instruction set computer (CISC) principles. In general, processor 1110 may be any device that manipulates information in a logical manner.

Input/output system 1120 may, for example, include one or more communication interfaces and/or one or more user interfaces. A communication interface may, for instance, be a network interface card (whether wireless or wireless) or a modem. A user interface could, for instance, include one or more user input devices (e.g., a keyboard, a keypad, a mouse, a touchpad, a stylus, or a microphone) and/or one or more user output devices (e.g., a monitor, a display, or a speaker). In general, system 1120 may include any combination of devices by which a computer system can receive and output information.

Memory 1130 may, for example, include random access memory (RAM), read-only memory (ROM), and/or disc memory. Various items may be stored in different portions of the memory at various times. Memory 1130, in general, may be any combination of devices for storing information.

Memory 1130 includes instructions 1132 and data 1136. Instructions 1132 include an operating system 1133 (e.g., Windows, Linux, or Unix) and applications 1134, one of which is a stock transaction application 1135, which is responsible for managing the buying and selling of stocks. Using application 1135 processor 1120 may perform one or more of the processes described previously. Data 1136 includes the data required for and generated by applications 1134. For instance, data 1136 may hold stock information 1137 (e.g., prices, volumes, etc.), contestant accounts 1138 (e.g., credits, stocks owned, stocks being watched, etc.), and athlete information 1139 (e.g., projected draft order, statistics, injury updates, etc.).

Network system 1140 is responsible for communicating information between processor 1110, input/output system 1120, and memory 1130. Network system 1140 may, for example, include a number of different types of busses (e.g., serial and parallel).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for implementing automated stock transactions regarding athletes transitioning between completive levels, and several others have been mentioned or suggested. Moreover, those skilled in the art will readily recognize that a variety of additions, deletions, modifications, and substitutions may be made to these implementations while still achieving automated stock transactions regarding athletes transitioning between completive levels. Thus, the scope of the protected subject matter should be judged based on the following claims, which may capture one or more concepts of one or more implementations.

The invention claimed is:

1. A method for performing automated fantasy stock transactions regarding athletes that may be transitioning to a higher competitive level, the method comprising:
    allotting contestants a number of virtual game credits that they can use to buy stocks;
    determining prices for stocks associated with athletes at an amateur level based on athletes' projected salaries at a professional level, the determination comprising determining projected draft positions for athletes and correlating the draft positions with the projected salaries;
    receiving requests from contestants to buy stocks:
    assigning stocks, by one or more processors, to contestants in accordance with the stock prices; and
    debiting contestants' virtual game credits as they buy stocks.

2. The method of claim 1, further comprising:
    determining revised stock prices based on sales of stock to contestants;
    publishing information regarding the revised stock prices; and
    executing buy/sell requests from contestants to facilitate the selling and buying of stock between contestants based on the revised stock prices.

3. The method of claim 1, further comprising:
    determining revised stock prices based on revised projections of the athletes' salaries at the professional level;
        publishing information regarding the revised stock prices; and
        executing buy/sell requests from contestants to facilitate contestants' selling and buying of stock based on the revised stock prices.

4. The method of claim 1, further comprising determining a final price for each stock.

5. The method of claim 4, wherein determining a final price for each stock is based on an order in which the associated athletes are selected in a draft for the professional level.

6. The method of claim 4, wherein determining a final price for each stock is based on a salary of each athlete at the professional level.

7. The method of claim 4, further comprising determining contestant performance based on the final stock prices.

8. The method of claim 1, wherein the amateur level does not have salaries for the athletes.

9. A system for performing automated fantasy stock transactions regarding athletes that may be transitioning to a higher competitive level, the system comprising:
    a server system comprising one or more processors configured to:
    allot contestants a number of virtual game credits that they can use to buy stocks;
    determine prices for stocks associated with athletes at an amateur level based on athletes' projected salaries at a professional level, the determination comprising determining projected draft positions for athletes and correlating the draft positions with the projected salaries;
    receive requests from contestants to buy stocks;
    assign stocks to contestants in accordance with the stock prices; and
    debiting contestants' virtual game credits as they buy stocks.

10. The system of claim 9, wherein the server system is further configured to determine revised stock prices based on sales of stock to contestants, publish information regarding the revised stock prices, and execute buy/sell requests from contestants to facilitate the selling and buying of stock between the contestants based on the revised stock prices.

11. The system of claim 9, wherein the server system is further configured to determine revised stock prices based on revised projections of the athletes' salaries at the professional level, publish information regarding the revised stock prices, and execute buy/sell requests from contestants to facilitate contestants' selling and buying of stock based on the revised stock prices.

12. The system of claim 9, wherein the server system is further configured to determine a final price for each stock.

13. The system of claim 12, wherein determining a final price for each stock is based on the order an in which the associated athletes are selected in a draft for the professional level.

14. The system of claim 12, wherein the server system is further configured to determine contestant performance based on the final stock prices.

15. A computer program product for performing automated fantasy stock transactions regarding athletes that may be transitioning to a higher competitive levels level, the computer program product comprising:
    a non-transitory computer readable storage medium;
    first program instructions to determine prices of stocks associated with athletes at an amateur level based on athletes' projected salaries at a professional level, the determination comprising determining projected draft positions for athletes and correlating the draft positions with the projected salaries; and
    second program instructions to allot contestants a number of virtual games credits, receive requests from contestants to buy stocks, assign stocks to contestants in accordance with the stock prices, and debit contestants' virtual game credits as they buy stocks;
    wherein said program instructions are stored on said computer readable storage medium and executed by one or more processors.

16. The computer program product of claim 15, further comprising:
    third program instructions to determine revised stock prices based on sales of stock to contestants;
    fourth program instructions to publish information regarding the revised stock prices; and
    fifth program instructions to execute buy/sell requests from contestants to facilitate the selling and buying of stock between the contestants based on the revised stock prices.

17. The computer program product of claim 15, further comprising:
    sixth program instructions to determine revised stock prices based on revised projections of the athletes' salaries at the professional level;
    seventh program instructions to publish information regarding the revised stock prices;
    and
    eighth program instructions to execute buy/sell requests from contestants to facilitate contestants' selling and buying of stock based on the revised stock prices.

18. The computer program product of claim 15, further comprising ninth program instructions to determine a final price for each stock.

19. The computer program product of claim 18, wherein determining a final price for each stock is based on an order in which the associated athletes are selected in a draft for the professional level.

20. The computer program product of claim 18, further comprising tenth program instructions to determine contestant performance based on the final stock prices.

* * * * *